US006785609B2

(12) United States Patent
Suda

(10) Patent No.: US 6,785,609 B2
(45) Date of Patent: Aug. 31, 2004

(54) HYBRID PROCESSING METHOD AND APPARATUS, NAVIGATION SYSTEM, PROGRAM STORAGE DEVICE AND COMPUTER DATA SIGNAL EMBODIED IN CARRIER WAVE

(75) Inventor: Hiroyuki Suda, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/138,479

(22) Filed: May 6, 2002

(65) Prior Publication Data

US 2002/0169554 A1 Nov. 14, 2002

(30) Foreign Application Priority Data

May 8, 2001 (JP) ........................................ 2001-137805

(51) Int. Cl.[7] .......................... G01C 21/00; G08G 1/123
(52) U.S. Cl. ........................ 701/216; 701/207; 340/988
(58) Field of Search ................................ 701/216, 207, 701/220, 200, 300, 227; 340/988; 702/93, 94; 342/357.14, 451, 461

(56) References Cited

U.S. PATENT DOCUMENTS

| | | | | | |
|---|---|---|---|---|---|
| 4,903,212 | A | * | 2/1990 | Yokouchi et al. | ............ 364/449 |
| 5,119,301 | A | * | 6/1992 | Shimizu et al. | ............. 364/450 |
| 5,155,688 | A | * | 10/1992 | Tanaka et al. | .............. 364/454 |
| 5,235,514 | A | * | 8/1993 | Matsuzaki | ................... 364/454 |
| 5,383,127 | A | * | 1/1995 | Shibata | ........................ 364/449 |
| 5,416,712 | A | | 5/1995 | Geier et al. | .................. 364/450 |
| 5,422,639 | A | * | 6/1995 | Kobayashi et al. | ......... 340/988 |
| 5,424,953 | A | * | 6/1995 | Masumoto et al. | ......... 364/449 |
| 5,906,655 | A | | 5/1999 | Fan | ............................ 701/216 |

FOREIGN PATENT DOCUMENTS

| | | |
|---|---|---|
| EP | 0 629 877 A1 | 12/1994 |
| JP | 10-307036 | 11/1998 |
| WO | WO 01/20260 A1 | 3/2001 |

OTHER PUBLICATIONS

Broatch et al., An Integrated Navigation System Manager Using Federated Kalman Filtering, Aerospace and Electronics Conference, 1991. Naecon 1991., proceedings of the IEEE 1991 National Dayton, Oh, USA May 20–24, 1991, New York, NY, USA IEEE, US May 20, 1991, pp. 422–426.
Wei–Wen Kao, Integration of GPS and Dead–Reckoning Navigation Systems, Proceedings of the Vehicle Navigation and Information Systems Conference. Dearborn, Oct. 20–23, 1991, NY, IEEE, US, vol. 2, Oct. 20, 1991, pp. 635–643.
Mar et al., Simulations of the positioning accuracy of integrated vehicular navigation systems, IEE Proc. Radar, Sonar & Navig., Institution of Electrical Engineers, GB, vol. 143, No. 2, Apr. 3, 1996.
Abbott et al., Land–Vehicle Navigation Using GPS, Proceedings of the IEEE, IEEE. NY, US vol. 87. No. 1, Jan. 1999.
Kim et al., Compensation of Gyroscope Errors and GPS/DR Integration, Position Location and Navigation Symposium, 1996., IEEE 1996 Atlanta, GA USA Apr. 22–26, 1996, NY, NY, USA, IEEE, US, Apr. 22, 1996.

* cited by examiner

Primary Examiner—Tan Q. Nguyen
Assistant Examiner—Dalena Tran
(74) Attorney, Agent, or Firm—Morgan, Lewis & Bockius LLP

(57) ABSTRACT

A hybrid processing apparatus outputs current position data, indicating a current position of a movable body, on the basis of self-contained positioning data from a self-contained positioning apparatus (10) and GPS measurement data from a GPS receiver (18). In the hybrid apparatus, a judging device (20) judges whether or not an estimated error of the self-contained positioning data is greater than a predetermined threshold value. A first calculation device (20) calculates the current position by combining the GPS measurement data with the self-contained positioning data or a second calculation device (20) calculates the current position without combining the GPS measurement data, depending upon a judgment result of the judging device.

13 Claims, 4 Drawing Sheets

HYBRID PROCESSING METHOD AND APPARATUS, NAVIGATION SYSTEM, PROGRAM STORAGE DEVICE AND COMPUTER DATA SIGNAL EMBODIED IN CARRIER WAVE

BACKGROUND OF THE INVENTION

1. Field of the Invention

The present invention generally relates to a hybrid processing method and apparatus. In the hybrid processing method, a self-contained or built-in positioning method using a vehicle speed sensor, a gyro sensor or the like, is combined with a GPS (Global Positioning System) method of positioning or measuring a current position of a movable body on the basis of radio waves from GPS satellites. Similarly, in the hybrid processing apparatus, a self-contained or built-in positioning apparatus using a vehicle speed sensor, a gyro sensor or the like, is combined with a GPS apparatus. The present invention also relates to a navigation system including the above-mentioned hybrid processing apparatus, a program storage device and a computer data signal embodiment in a carrier wave, which allow a computer to function as the hybrid processing apparatus.

2. Description of the Related Art

Nowadays a navigation system of a movable body such as a vehicle, an airplane, a ship or the like generally performs various types of hybrid processing, in which the self-contained positioning measurement using a vehicle speed sensor, a gyro sensor or the like, is combined with the GPS measurement in one way or another.

For example, Japanese Patent Application Laying Open NO. Hei 10-307036 discloses such a technique that an error correction is performed with respect to acceleration data, drive distance data, advance azimuth data or the like as self-contained positioning data, on the basis of GPS measurement.

Moreover, as for the GPS measurement, a current position is calculated independently, for example, every one or two seconds. Thus, there is such a technique to estimate or predict the current position, which is to be calculated next time i.e., for the n+1-th time, by virtue of a Kalman filter, a position filter or the like with using the current position calculated this time i.e., for the n-th time as a standard, and to thereby perform an error correction based on this estimated or predicted position with respect to the current position, which is actually calculated for the n+1-th time. Accordingly, the corrected current position can be calculated with a higher accuracy.

By the way, the radio wave from the GPS satellite may have other paths to go through to the GPS receiver after reflecting on the surface of a huge building or the like once or more times, in addition to the path to go direct to the GPS receiver, especially around the huge building such as a skyscraper, a high-rise building, or the like. This phenomenon, under which the radio waves are received at the same time through a plurality of radio wave paths from the one identical GPS satellite, is called as a "multi-path". When the multi-path in this kind is generated, the accuracy of the GPS measurement deteriorates. Namely, the GPS measurement has such a disadvantage that the generation of the multi-path certainly deteriorates a positioning accuracy.

On the other hand, as for a self-contained sensor such as a gyro sensor or the like as described above, it has a big start drift when switching on a power. Then, if, for example, the start drift of a gyro sensor occurs, an angle is calculated with deviation. Therefore, a specification of a gyro sensor or the like describes that the error of its output increases for a predetermined period such as 10 min or 15 min after starting. Consequently, there is concern that the accuracy of the GPS measurement deteriorates more if the output of the self-contained sensor is reflected to the GPS measurement within this predetermined period after starting.

However, there is such a problem that, if the accuracy of the GPS measurement deteriorates by the generation of the multi-path as described above for 10 min or 15 min after starting, the positioning accuracy by the hybrid based on the GPS measurement data deteriorates similarly.

SUMMARY OF THE INVENTION

It is therefore an object of the present invention to provide a hybrid processing method and apparatus, which can measure a position with a relatively high accuracy after starting including just after starting a navigation system, an on-vehicle navigation system including the above-mentioned hybrid processing apparatus, as well as a program storage device and a computer data signal embodiment in a carrier wave, which allow a computer to function as the hybrid processing apparatus.

The above object of the present invention can be achieved by a hybrid processing method of outputting current position data, which indicate a current position of a movable body on which a self-contained positioning device and a GPS device are mounted, on the basis of self-contained positioning data from the self-contained positioning device and GPS measurement data from the GPS device, the method provided with: a judgment process of judging whether or not an estimated error of the self-contained positioning data is greater than a predetermined threshold value; a first calculation process of calculating the current position by combining the GPS measurement data with the self-contained positioning data if the estimated error is judged not greater than the predetermined threshold value; a second calculation process of calculating the current position from the GPS measurement data without combining the GPS measurement data with the self-contained positioning data if the estimated error is judged greater than the predetermined threshold value; and an output process of outputting the current position calculated by the first or second calculation process as the current position data which indicate the current position of the movable body.

According to the hybrid processing method of the present invention, such a judgment is performed by a judgment process that whether or not an estimated or predicted error of the self-contained positioning data is greater than a predetermined threshold value. This kind of estimated or predicted error may be calculated by the self-contained positioning device and may be outputted together with the self-contained positioning data. Alternatively, it may be calculated on the basis of the self-contained positioning data outputted from the self-contained positioning device. The predetermined threshold value is individually and concretely determined depending on the each specification of the self-contained positioning devices or the like experientially, experimentally, theoretically, or simulationally etc. It may be a fixed value or a variable value depending on an actual operational condition. Then, the current position is calculated by the first calculation process by combining the GPS measurement data with the self-contained positioning data if the estimated error is judged not greater than the predetermined threshold value. Namely, if the estimated error is to some degree small even after starting the navigation system, including just after starting the navigation system, the start drift of the self-contained positioning data is relatively minor. Accordingly, when combining the self-contained positioning data with the GPS measurement data, the action or effect of restraining the accuracy deterioration due to the multi-path etc., in the GPS measurement data by virtue of the self-contained positioning data becomes superior to the action or effect of deteriorating the measurement accuracy due to the start drift. Therefore, in this case, it can effectively prevent the accuracy of such a finally outputted current position from being degraded due to the deterioration of the GPS measurement accuracy by the multi-path or the like by calculating the corrected current position as combining the GPS measurement data with the self-contained positioning data in the first calculation process.

On the other hand, the current position is calculated by the second calculation process by the GPS measurement data without combining the GPS measurement data with the self-contained positioning data if the estimated error is judged greater than the predetermined threshold value. Namely, if the estimated error is to some degree considerable after starting the navigation system, including just after starting the navigation system, the start drift of the self-contained positioning data is considered relatively large. Accordingly, when combining the self-contained positioning data with the GPS measurement data, the action or effect of deteriorating the measurement accuracy due to the start drift becomes superior to the action or effect of restraining the accuracy deterioration due to the multi-path etc., in the GPS measurement data by virtue of the self-contained positioning data. Therefore, in this case, it can effectively prevent the accuracy of such a finally outputted current position from being degraded due to the deterioration of the self-contained positioning accuracy by the start drift, by calculating the current position only from the GPS measurement data in the second calculation process.

As a result, it is possible to measure or position with a relatively high accuracy by the hybrid processing even after starting the navigation system, including just after starting the navigation system.

In one aspect of the hybrid processing method, estimated error data, which indicate the estimated error, are outputted from the self-contained positioning device and the judgment process performs the judgment on the basis of the estimated error data.

According to this aspect, the estimated error data are outputted from the self-contained positioning device in real time. This is done by the similar or the same software processing or the like as that of a built-in microcomputer of a gyro sensor for outputting the estimated error data, which are traditionally used for decision of an object range of map matching or for a standard of how urgent an error correction to the self-contained positioning measurement result is, for example. Consequently, the judgment based on the estimated error data in the judgment process can be relatively easily performed on the basis of the estimated error data outputted in real time from the self-contained positioning device.

Alternatively, in another aspect of the hybrid processing method, the method is further provided with an estimated error calculation process of calculating the estimated error on the basis of the self-contained positioning data.

According to this aspect, even if the self-contained positioning device is not provided with a function of outputting the estimated error data, it is possible to calculate the estimated error on the basis of the self-contained positioning data or the like from the self-contained positioning device, by the estimated error calculation process. If using the estimated error as calculated above, it is possible to perform the judgment in the judgment process relatively easily and surely.

In another aspect of the hybrid processing method, the first calculation process (i) calculates the n-th measurement position from the GPS measurement data outputted for the n-th time (n is a natural number) by the GPS device, (ii) estimates the n+1-th measurement position as an estimated position depending on the self-contained positioning data with using the n-th measurement position as a standard, (iii) calculates the n+1-th measurement position from the GPS measurement data outputted for the n+1-th time by the GPS device, and (iv) performs an error correction based on the estimated position with respect to the n+1-th measurement position, to thereby calculate the n+1-th corrected measurement position as the current position, and the second calculation process (v) calculates the n-th measurement position from the GPS measurement data outputted for the n-th time by the GPS device, (vi) estimates the n+1-th measurement position as an estimated position depending on the GPS measurement data with using the n-th measurement position as a standard, (vii) calculates the n+1-th measurement position from the GPS measurement data outputted for the n+1-th time by the GPS device, and (viii) performs an error correction based on the estimated position with respect to the n+1-th measurement position, to thereby calculate the n+1-th corrected measurement position as the current position.

According to this aspect, the n-th measurement position is calculated from the GPS measurement data outputted for the n-th time (i.e. previous time) in the first calculation process, if the estimated error is judged not greater than the predetermined threshold value by the judgment process. Then, the n+1-th measurement position is estimated as an estimated position depending on the self-contained positioning data such as a vehicle speed sensor, a gyro sensor, or the like with using the n-th measurement position as a standard. This estimation is performed by using a position filter, a Kalman filter, or the like, which are well known to the art. Then, the n+1-th measurement position is calculated from the GPS measurement data outputted for the n+1-th time (i.e. current time) by the GPS device. Moreover an error correction based on the estimated position estimated by using the above-mentioned Kalman filter or the like is performed with respect to the n+1-th measurement position and the n+1-th corrected measurement position is calculated as the current position.

On the other hand, if the estimated error is judged greater than the predetermined threshold value by the judgment process, the n-th measurement position is calculated from the GPS measurement data outputted for the n-th time (i.e. previous time) in the second calculation process. Then, the n+1-th measurement position is estimated as an estimated position depending on the GPS measurement data (e.g. the GPS measurement data which are outputted for the n-th time, for the n−1-th time, for the n−2-th time, . . . , and which are stored in a memory or the like) with using the n-th measurement position as a standard. This estimation is performed by a Kalman filter which is well known to the art. Then, the n+1-th measurement position is calculated from the GPS measurement data outputted for the n+1-th time (i.e. current time). Moreover, an error correction based on the estimated position estimated by using the above-mentioned Kalman filter or the like is performed with respect to the n+1-th measurement position, and the n+1-th corrected measurement position is calculated as the current position.

Consequently, according to this aspect, it is possible to measure or position with a relatively high accuracy by the hybrid processing, by using the GPS measurement data in estimating the estimated position if the estimated error of the self-contained positioning data is relatively large while by using the self-contained positioning data in estimating the estimated position if the estimated error of the self-contained positioning data is relatively small.

In another aspect of the hybrid processing, the judgment process performs the judgment before elapsing a predetermined period from a time of switching on a power of the self-contained positioning device and does not perform the judgment after elapsing the predetermined period, and if the judgment is not performed, the present position is calculated by the first calculation process.

According to this aspect, the judgment by the judgment process is performed if it is before elapsing a predetermined period from a time of switching on a power of the self-contained positioning device. Namely, the judgment process is performed under the condition that the error by the start drift may be more or less generated. The judgment by the judgment process is not performed if it is after elapsing the predetermined period, and the current position is calculated by the first calculation process. Namely, the judgment process is not performed under the condition that the error by the start drift is not generated, and the current position is calculated by combining the self-contained positioning data with the GPS measurement data by the first calculation process.

The above object of the present invention can be achieved by a hybrid processing apparatus for outputting current position data, which indicate a current position of a movable body on which a self-contained positioning device and a GPS device are mounted, on the basis of self-contained positioning data from the self-contained positioning device and GPS measurement data from the GPS device, the apparatus provided with: a judgment device for judging whether or not an estimated error of the self-contained positioning data is greater than a predetermined threshold value; a first calculation device for calculating the current position by combining the GPS measurement data with the self-contained positioning data if the estimated error is judged not greater than the predetermined threshold value; a second calculation device for calculating the current position from the GPS measurement data without combining the GPS measurement data with the self-contained positioning data if the estimated error is judged greater than the predetermined threshold value; and an output device for outputting the current position calculated in the first or second calculation device as the current position data which indicate the current position of the movable body.

According to the hybrid processing apparatus of the present invention, such a judgment is performed by a judgment device.that whether or not an estimated error of the self-contained positioning data is greater than a predetermined threshold value. Then, the current position is calculated by the first calculation device by combining the GPS measurement data with the self-contained positioning data if the estimated error is judged not greater than the predetermined threshold value. Namely, in this case, it can effectively prevent the accuracy of such a finally outputted current position from being degraded due to the deterioration of the GPS measurement accuracy by the multi-path or the like, by calculating the correct current position while combining the GPS measurement data with the self-contained positioning data in the first calculation device.

On the other hand, the current position is calculated by the second calculation device by the GPS measurement data without combining the GPS measurement data with the self-contained positioning data if the estimated error is judged greater than the predetermined threshold value. Namely, in this case, it can effectively prevent the accuracy of such a finally outputted current position from being degraded due to the deterioration of the accuracy of the self-contained positioning measurement by the multi-path or the like, by calculating the correct current position only from the GPS measurement data in the second calculation device.

As a result, it is possible to measure or position with a relatively high accuracy by the hybrid processing even after starting the navigation system, including just after starting the navigation system.

In one aspect of the hybrid processing apparatus, estimated error data, which indicate the estimated error, are outputted from the self-contained positioning device and the judgment device performs the judgment on the basis of the estimated error data.

According to this aspect, the estimated error data are outputted from the self-contained positioning device in real time by the similar or the same software processing or the like as that of a built-in microcomputer of a gyro sensor, for example. Consequently, the judgment based on the estimated error data in the judgment process can be relatively easily performed.

Alternatively, in another aspect of the hybrid processing apparatus, the apparatus is further provided with an estimated error calculation device for calculating the estimated error on the basis of the self-contained positioning data.

According to this aspect, even if the self-contained positioning device is not provided with a function of outputting the estimated error data, it is possible to calculate the estimated error on the basis of the self-contained positioning data or the like from the self-contained positioning device by the estimated error calculation device. If using the estimated error as calculated above, it is possible to perform the judgment in the judgment device relatively easily and surely.

In another aspect of the hybrid processing apparatus, the first calculation device (i) calculates the n-th measurement position from the GPS measurement data outputted for the n-th time (n is a natural number) by the GPS device, (ii) estimates the n+1-th measurement position as an estimated position depending on the self-contained positioning data with using the n-th measurement position as a standard, (iii) calculates the n+1-th measurement position from the GPS measurement data outputted for the n+1-th time by the GPS device, and (iv) performs an error correction based on the estimated position with respect to the n+1-th measurement position, to thereby calculate the n+1-th corrected measurement position as the current position, and the second calculation device (v) calculates the n-th measurement position from the GPS measurement data outputted for the n-th time by the GPS device, (vi) estimates the n+1-th measurement position as an estimated position depending on the GPS measurement data with using the n-th measurement position as a standard, (vii) calculates the n+1-th measurement position from the GPS measurement data outputted for the n+1-th time by the GPS device, and (viii) performs an error correction based on the estimated position with respect to the n+1-th measurement position, to thereby calculate the n+1-th corrected measurement position as the current position.

According to this aspect, the n-th measurement position is calculated from the GPS measurement data outputted for the n-th time (i.e. previous time) in the first calculation device, if the estimated error is judged not greater than the predetermined threshold value by the judgment device. Then, the n+1-th measurement position is estimated as an estimated position depending on the self-contained positioning data such as a vehicle speed sensor, a gyro sensor, or the like with the n-th measurement position as a standard. Then, the n+1-th measurement position is calculated from the GPS measurement data outputted for the n+1-th time (i.e. current time) by the GPS device. Moreover an error correction based on the estimated position is performed with respect to the n+1-th measurement position, and the n+1-th corrected measurement position is calculated as the current position.

On the other hand, if the estimated error is judged greater than the predetermined threshold value by the judgment process, the n-th measurement position is calculated from the GPS measurement data outputted for the n-th time (i.e. previous time) in the second calculation process. Then, the n+1-th measurement position is estimated as an estimated position depending on the GPS measurement data with using the n-th measurement position as a standard. Then, the n+1-th measurement position is calculated from the GPS measurement data outputted for the n+1-th time (i.e. current time). Moreover, an error correction based on the estimated position is performed with respect to the n+1-th measurement position, and the n+1-th corrected measurement position is calculated as the current position.

Consequently, according to this aspect, it is possible to measure or position with a relatively high accuracy by the hybrid processing, by using the GPS measurement data in estimating the estimated position if the estimated error of the self-contained positioning data is relatively large while by using the self-contained positioning data in estimating the estimated position if the estimated error of the self-contained positioning data is relatively small.

In another aspect of the hybrid processing apparatus, the judgment device performs the judgment before elapsing a predetermined period from a time of switching on a power of the self-contained positioning device and does not perform the judgment after elapsing the predetermined period, and if the judgment is not performed, the present position is calculated by the first calculation device.

According to this aspect, the judgment by the judgment device is performed if it is before elapsing a predetermined period from a time of switching on a power of the self-contained positioning device. Namely, the judgment device is performed under the condition that the error by the start drift may be more or less generated. The judgment by the judgment device is not performed if it is after elapsing the predetermined period, and the current position is calculated by the first calculation device. Namely, the judgment device is not performed under the condition that the error by the start drift is not generated, and the current position is calculated by combining the self-contained positioning data with the GPS measurement data by the first calculation device.

The above object of the present invention can be achieved by an on-vehicle navigation system provided with: the above-mentioned hybrid processing apparatus of the present invention (including its various aspects), the self-contained positioning device and the GPS device, and a display device for displaying the current position data outputted from the output device on map data in a predetermined format.

According to this aspect of the on-vehicle navigation system of the present invention, the self-contained position-ing data are outputted from the self-contained positioning device and the GPS measurement data are outputted from the GPS device. Then, these data are appropriately combined depending on how considerable the estimated error of the self-contained positioning data is by the above-mentioned hybrid processing apparatus of the present invention and the current position data are outputted. Then, the current position data are displayed on map data in a predetermined format by the display device. Therefore, it is possible to display the highly accurate current position data on a map even after starting the navigation system, including just after starting the navigation system.

The above object of the present invention can be also achieved by a program storage device readable by a computer. The program storage device stores a program of instructions to cause the computer to function as at least one portion of the above-described hybrid processing apparatus of the present invention (including its various aspects).

According to the program storage device, such as a CD-ROM, a ROM, a DVD, a floppy disk or the like, of the present invention, the above described hybrid processing apparatus of the present invention can be relatively easily realized as a computer reads and executes the program of instructions or as it executes the program after downloading the program through communication device. Moreover, the program of instructions can be sent from a central device with an application program required for the navigation or other data such as a map.

The above object of the present invention can be also achieved by a computer data signal embodied in a carrier wave and representing a series of instructions for a computer. The series of instructions causes the computer to function as at least one portion of the above-described hybrid processing apparatus of the present invention (including its various aspects).

According to this computer data signal embodied in the carrier wave of the present invention, as the computer downloads the program in the computer data signal through a computer network or the like, and executes this program, it is possible to realize the above described hybrid processing apparatus of the present invention.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(I) First Embodiment

At first, an on-vehicle navigation system in the first embodiment will be explained with reference to FIG. 1 to FIG. 3.

Figure 1:
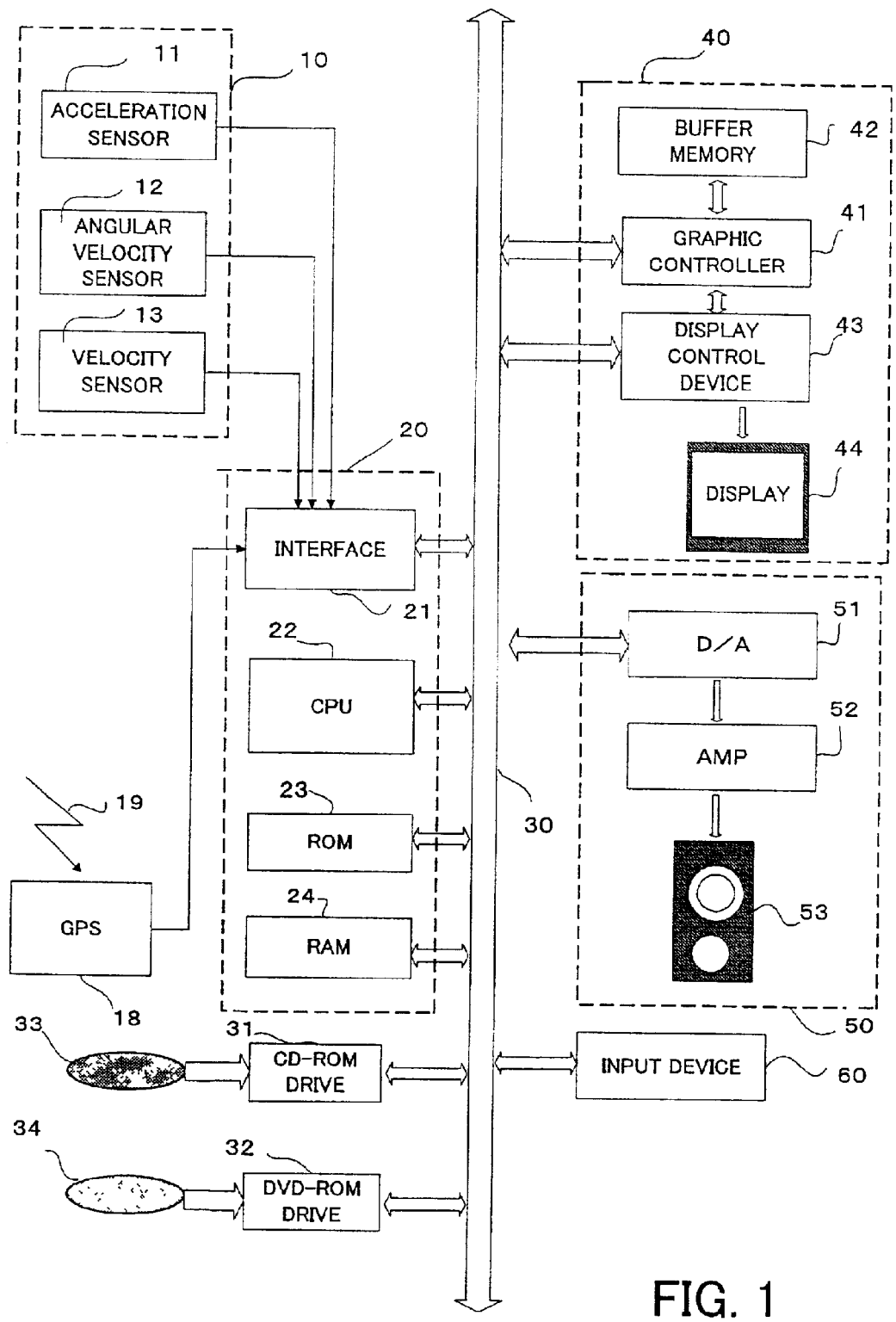
FIG. 1 is a block diagram showing a structure of an on-vehicle navigation system as a first embodiment of the present invention.

As shown in FIG. 1, the on-vehicle navigation system in the first embodiment is provided with a self-contained positioning apparatus 10, a GPS receiver 18, a system controller 20, a CD-ROM drive 31, a DVD-ROM drive 32, a display unit 40, an audio output unit 50, and an input device 60.

The self-contained positioning apparatus 10 is constructed to include an acceleration sensor 11, an angular velocity sensor 12, and a velocity sensor 13. The acceleration sensor 11, which has, for example, a piezoelectric element, detects an acceleration of a vehicle and outputs acceleration data. The angular velocity sensor 12, which has, for example, a vibration gyro, detects an angular velocity of a vehicle when a direction of the vehicle is changed and outputs angular velocity data and relative azimuth data.

The velocity sensor 13 detects the rotation of a vehicle shaft mechanically, magnetically, or optically and is constructed by a vehicle speed sensor, which generates a vehicle speed pulse as a pulse signal at every rotation for a predetermined angle around the vehicle shaft.

The GPS receiver 18 is a part to receive a radio wave 19. The radio wave 19 carries the down link data including the data for positioning and is from a plurality of GPS satellites to be used for detection of an absolute position of a vehicle by the information about latitude, longitude or the like.

The system controller 20 includes an interface 21, a CPU (Central Processing Unit) 22, a ROM (Read Only Memory) 23 and a RAM (Random Access Memory) 24 and is constructed to control the whole navigation apparatus.

The interface 21 performs an interface operation for the acceleration sensor 11, the angular velocity sensor 12, the velocity sensor 13, and the GPS receiver 18. Then from them respectively, it inputs into the system controller 20 the acceleration data, the relative azimuth data, the angular velocity data, GPS measurement data, absolute azimuth data etc. in addition to the vehicle speed pulse. The CPU 22 controls the whole system controller 20. The ROM 23 has a not-illustrated non-volatile memory where a control program etc. for controlling a system controller 20 is stored. The RAM 24 readably stores various types of data such as route data, which are set in advance by a user through the input device 60, and supplies a working area to the CPU 22.

The system controller 20, the CD-ROM drive 31, the DVD-ROM drive 32, the display unit 40, the audio output unit 50, and the input device 60 are mutually connected through a bus line 30.

The CD-ROM drive 31 and the DVD-ROM drive 32, under the control of the system controller 20, read a control program corresponding to each embodiment described below and various types of data such as road data etc. including the number of traffic lane, road width, and the like from a CD 33 and a DVD 34, respectively, and then output them. Incidentally, it is possible to dispose either one of the CD-ROM drive 31 and the DVD-ROM drive 32, and it is also possible to dispose a CD and DVD compatible drive.

The display unit 40, under the control of the system controller 20, displays various types of display data. The display unit 40 is provided with: a graphic controller 41, which controls the whole display unit 40 on the basis of control data transmitted from the CPU 22 through the bus line 30; a buffer memory 42, which is constructed by a memory such as a VRAM (Video RAM) etc. and temporarily memorizes immediately displayable image information; a display control device 43, which controls of display of a display device 44 such as a liquid crystal device, a CRT (Cathode Ray Tube), or the like on the basis of image data outputted from the graphic controller 41; and the display device 44. The display device 44 is constructed by a liquid crystal display device etc., on the order of 5 to 10 inches in diagonal length for example and is installed around a front panel inside the vehicle.

The audio output unit 50 is provided with: a D/A (Digital to Analog) converter 51, which performs a D/A conversion of the sound digital data transmitted through the bus line 30 from the CD-ROM drive 31, the DVD-ROM 32, or the RAM 24 etc., under the control of the system controller 20; an amplifier (AMP) 52, which amplifies a sound analog signal outputted from the D/A converter 51; and a speaker 53, which converts the amplified sound analog signal to a sound and outputs it into the vehicle.

The input device 60 is provided with a key, a switch, a button, a remote controller, and so on, to input various types of commands and data. The input device 60 is installed around the display device 44 or the front panel of a main body of the on-vehicle navigation system, which is mounted on the vehicle.

Now, a multi-path, which brings a degradation in the accuracy of the GPS measurement, will be explained with reference to FIG. 2.

Figure 2:
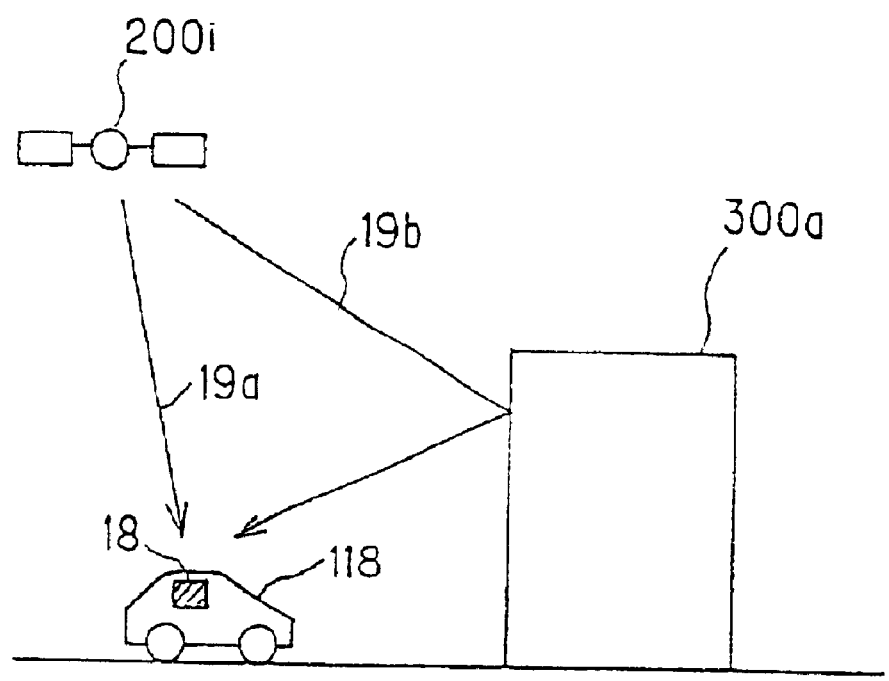
FIG. 2 is a schematic diagram showing a multi-path in the embodiment.

As shown in FIG. 2, the radio wave from the GPS satellite 200$i$ may have a reflected wave 19$b$, which goes through another path to the GPS receiver 18 after reflecting once or more times on the surface of a building 300$a$, in addition to a direct wave 19$a$, which goes direct to the GPS receiver 18, around the building 300$a$ such as a skyscraper, a high-rise building, or the like. As described above, when the direct wave 19$a$ and the reflected wave 19$b$ are received at the same time through a plurality of radio wave paths from the identical GPS satellite 200$i$, i.e. when the "multi-path" is generated, an error occurs in time required for the direct wave 19$a$ and the reflected wave 19$b$ coming to the GPS receiver 18 mounted on a vehicle 118. Due to this error in time, an error is induced in the pseudo-distance ri. If such a multi-path is generated, the pseudo-distance based on the direct wave 19$a$ and the pseudo-distanced based on the reflected wave 19$b$ are irregularly and alternatively measured in general, so that the arrival time and the pseudo-distance ri are flickered or changed at a short cycle. Thus, the accuracy of the GPS measurement deteriorates extremely.

Therefore, if calculating the current position data only from the GPS measurement data, the multi-path, as shown in FIG. 2, may adversely affect the current position data heavily. Thus, if the time duration while calculating the current position data is prolonged by combining the GPS measurement data with the self-contained positioning data, it is possible to decrease that kind of adverse effect of the multi-path. Hereinbelow, this embodiment is constructed to improve the accuracy of the current position data finally obtained, by decreasing the adverse effect of the multi-path or the like on the GPS measurement data. This is done by an effective use of the self-contained positioning data even within a certain period of time (e.g. 1 min, 5 min, 10 min, 15 min, etc.) just after starting when a start drift is generated, i.e., when an enormous error of the self-contained positioning data is supposed to be induced, in view of an apparatus specification of the self-contained positioning apparatus 10. Moreover, it is constructed to improve the accuracy of the current position data finally obtained, by nonuse of the self-contained positioning data if the adverse effect by the start drift is considerable because the start drift of the self-contained positioning data is actually enormous.

Namely, in FIG. 1, one example of the hybrid processing apparatus for outputting the current position data, which indicate the current position of a vehicle on which the self-contained positioning apparatus 10 and the GPS receiver 18 are mounted, on the basis of the self-contained positioning data from the self-contained positioning apparatus 10 and the GPS measurement data from the GPS receiver 18 is constructed by the system controller 20 in the first embodiment. Then, one example of the first and the second calculation device for calculating the current position selectively and one example of the output device for outputting the calculated current position by the first and the second calculation device as the current position data, which indicate the current position of the vehicle 118, are constructed by the system controller 20. Especially, it is constructed to calculate the current position from the GPS measurement data without combining the GPS measurement data with the self-contained positioning data in the case that the estimated error is judged greater than a predetermined threshold value and to calculate the current position by combining the GPS measurement data with the self-contained positioning data in the case that the estimated error is judged not greater than a predetermined threshold value.

The first embodiment may be constructed as following. Namely, the estimated error data which indicate the estimated error used for a hybrid processing of the system controller 20 is calculated with respect to at least one of various types of self-contained positioning data outputted from the self-contained positioning apparatus 10 (e.g. sensor output data from the angular velocity sensor 12 constructed by a gyro sensor) by logically establishing the estimated error calculation device in the system controller 20 by virtue of a software and by performing a software operation which is the similar or the same as the one of the known self-contained positioning apparatus.

A hybrid processing method in the first embodiment as well as the second embodiment as described below, is intended to be executed mainly in the CPU 22, as shown in FIG. 1, and is executed as one portion of a main navigation program which controls the whole on-vehicle navigation system to perform a navigation operation. Therefore, while executing the main navigation system program, operations shown in each flow chart of the embodiments are being executed. Moreover, the computer program in this kind may be stored in the ROM 23, the CD-ROM 33, or the DVD-ROM 34, or may be downloaded into the RAM 24 or the like through a communication device such as a modem, a cell phone, or the like. Instead of or in addition to it, map data etc., required for the navigation may be downloaded.

Next, a hybrid processing method in the on-vehicle navigation system in the first embodiment as constructed above will be explained with reference to a flow chart in FIG. 3.

Figure 3:
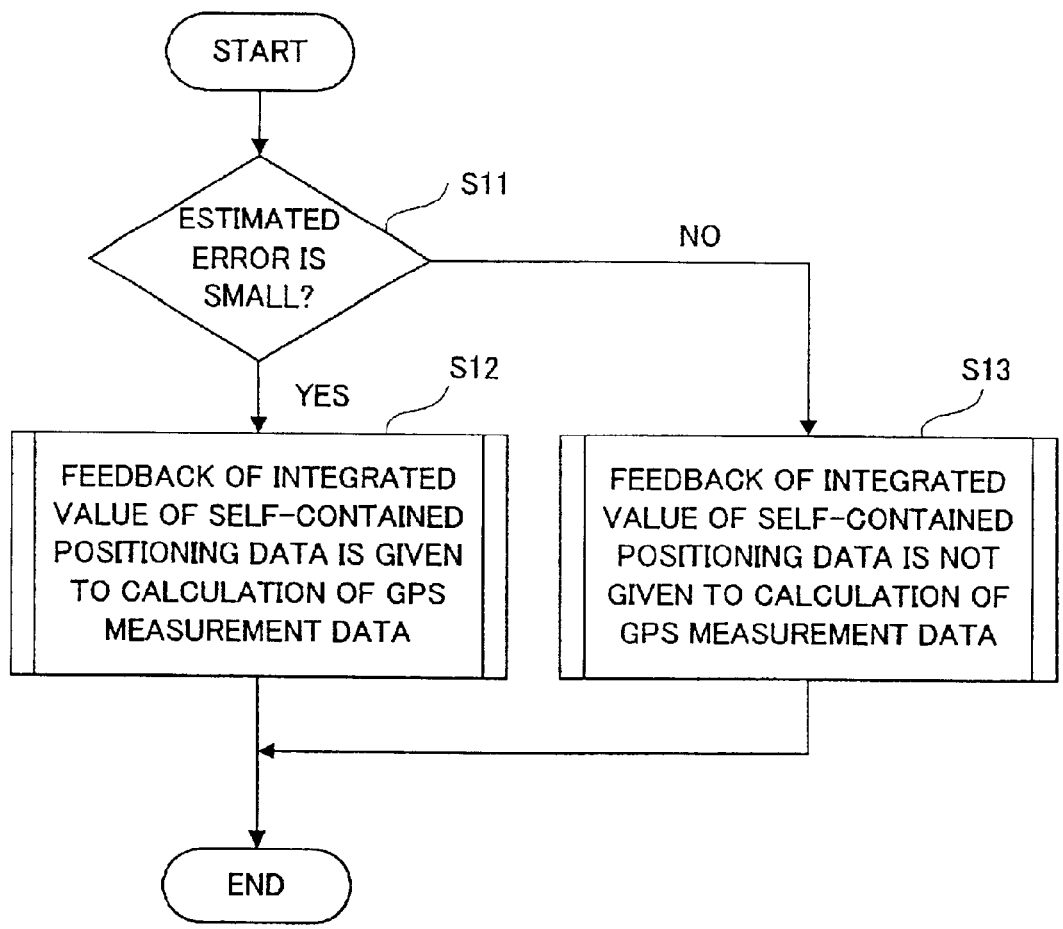
FIG. 3 is a flow chart showing a hybrid processing method in the first embodiment.

In FIG. 3, once the hybrid processing is started, it is judged whether or not a value of the estimated error of the self-contained positioning data such as a gyro output or the like is smaller than a predetermined threshold value on the basis of the estimated error data inputted through the interface 21 from the self-contained positioning apparatus 10 (step S11). This type of threshold value is individually and concretely determined depending on the specification of the velocity sensor 13, the angular velocity sensor 12, and the acceleration sensor 11, experientially, experimentally, theoretically, or simulationally etc. It may be a fixed value or a variable value depending on an actual operational condition of the navigation system. Moreover, a comparison between the estimated error and this kind of threshold value may be performed by a comparison between digital data, between analog data, or between voltages.

As a result of the judgment in step S11, if the estimated error value is judged smaller than a predetermined threshold value (step S11: YES), the current position is calculated by combining the GPS measurement data with the self-contained positioning data i.e., by giving feedback of an integrated value of the self-contained positioning data to a calculation of the GPS measurement data. More concretely, the n-th positioning or measurement position is calculated from the GPS measurement data outputted for the n-th time (i.e. previous time), for example. Then, the n+1-th measurement position is estimated as an estimated position by using a Kalman filter or a position filter in response to the self-contained positioning data of the velocity sensor 13, the angular velocity sensor 12 and the acceleration sensor 11, with using the n-th measurement position as a standard. Then, the n+1-th measurement position is calculated from the GPS measurement data outputted for the n+1-th time (i.e. current time). Moreover, an error correction based on the estimated position estimated by using a Kalman filter or a position filter as described above is performed with respect to the n+1-th measurement position, and the n+1-th corrected measurement position is calculated as the current position (step S12).

On the other hand, as a result of the judgment in step S11, if the estimated error value is judged not smaller than a predetermined threshold value (step S11: NO), the current position is calculated only from the GPS measurement data without giving the feed back of the integrated value of the self-contained positioning data to the calculation of the GPS measurement data. More concretely, the n-th positioning or measurement position is calculated from the GPS measurement data outputted for the n-th time (i.e. previous time), for example. Then, the n+1-th measurement position is estimated as the estimated position by using a Kalman filter or a position filter in response to the GPS measurement data which are outputted, for example, for the n-th time, for the n−1-th time, for the n−2-th time, . . . , with the n-th measurement position as a standard and which are stored in a memory or the like. Then, the n+1-th measurement position is calculated from the GPS measurement data outputted for the n+1-th time (i.e. current time). Moreover, the error correction based on the estimated position estimated by using a Kalman filter or a position filter as described above is performed with respect to the n+1-th measurement position, and the n+1-th corrected measurement position is calculated as the current position (step S13).

Furthermore, even after starting the navigation system, including just after starting the navigation system, the coordinates of the current position of the vehicle 118 calculated by the hybrid processing with a relatively high accuracy is displayed on a display map at the display device 44 (refer to FIG. 1) as the current position data.

In the first embodiment, as described above, if the estimated error is to some degree small even after starting the navigation system, including just after starting the navigation system, it can effectively prevent the accuracy of such a finally outputted current position from being decreased due to the deterioration of the GPS measurement accuracy by the multi-path or the like by combining the GPS measurement data with the self-contained positioning data i.e., giving the feedback of the integrated value of the self-contained positioning data to the calculation of the GPS measurement data at the step S12. Moreover, if the estimated error is to some degree considerable after starting the navigation system, including just after starting the navigation system, it can effectively prevent the accuracy of such a finally outputted current position from being decreased due to the deterioration of the self-contained positioning measurement accuracy by the start drift by calculating the current position only from the GPS measurement data without giving the feedback of the integrated value of the self-contained positioning data to the calculation of the GPS measurement data at the step S13.

As a result, according to the first embodiment, it is possible to measure or position with a relatively high accuracy by the hybrid processing even after starting the navigation system, including just after starting the navigation system.

(II) Second Embodiment

Figure 4:
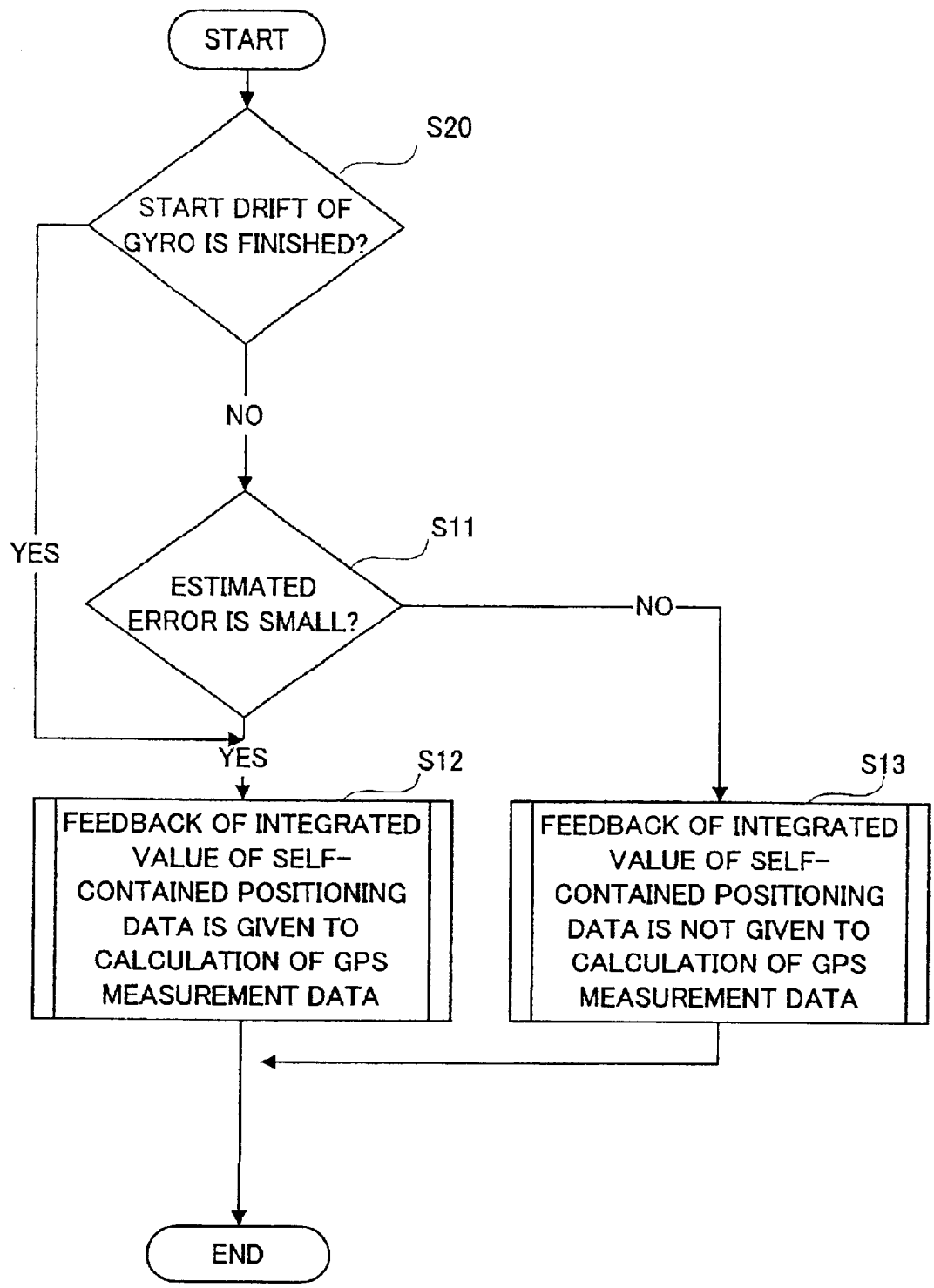
FIG. 4 is a flow chart showing a hybrid processing method in a second embodiment.

Next, the second embodiment of the present invention will be explained with reference to FIG. 4. FIG. 4 is a flow chart showing a hybrid processing method in the second embodiment. Incidentally, the hardware structure in the second embodiment is the same as the one in the first embodiment shown in FIG. 1. The same steps as those in FIG. 3 carry the same step numerals and the detailed explanations of them are omitted.

In the second embodiment, it is constructed to judge whether the estimated error value of the self-contained positioning data is considerable or small before elapsing a predetermined period from a time of switching on a power, i.e. while the start drift of the self-contained positioning data is generated, and it is constructed not to judge whether the estimated error value of the self-contained positioning data is considerable or small after elapsing the predetermined period, i.e. after the start drift is finished. The other structures in the second embodiment are the same as those in the first embodiment as described above.

Namely, in FIG. 4, it is firstly judged whether or not it is before elapsing a predetermined time period from a time of switching on a power of the self-contained positioning apparatus 10 such as the angular velocity sensor 12 constructed by a gyro or the like with reference to a built-in timer in the system controller 20 or the like (step S20). The predetermined time period corresponding to an end of the start drift of a gyro or the like in this kind may be, for example, 1 min, 5 min, 10 min, 15 min, . . . , it is individually and concretely determined depending on the respective specifications of the velocity sensor 13, the acceleration sensor 11, or the angular velocity sensor 12 constructed by a gyro and further depending on the positioning accuracy or the like required in the navigation system and for performance of the GPS receiver 18, experientially, experimentally, theoretically, or simulationally etc. It may be a fixed value or a variable value.

As a result of the judgment in the step S20, if the start drift of a gyro or the like is not finished (step S20: NO), the operational flow moves forward to the step S11. On the other hand, if the start drift of a gyro or the like is finished (step S20: YES), the operational flow moves forward to the step S12 and the same process as the one in the above-mentioned first embodiment is performed subsequently.

Therefore, according to the second embodiment, if it is before elapsing a predetermined period from a time of switching on a power of the angular velocity sensor 12 or the like constructed by a gyro, i.e. under such a condition that an error may be more or less generated by the start drift, it is intended to perform the judgment in the step S11. Moreover, if it is after elapsing a predetermined period from a time of switching on a power of the angular velocity sensor 12 or the like constructed by a gyro, i.e. under such a condition that an error by the start drift is not substantially generated, it is intended not to perform the judgment in the step S11, and the current position is calculated by combining the self-contained positioning data with the GPS measurement data.

Consequently, according to the second embodiment, it is possible to measure or position with a relatively high accuracy by the hybrid processing even after starting the navigation system, including just after starting the navigation system.

Each embodiment, as described above, is associated with an on-vehicle navigation apparatus. However, the hybrid processing method and the hybrid processing apparatus of the present invention are not limited to this and are allowed to be used for stably measuring or positioning a current position of an arbitrary movable body such as an animal, a human etc., who moves with the navigation apparatus, as well as an airplane, a ship, or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-137805 filed on May 8, 2001 including the specification, claims, drawings and summary is incorporated herein by reference in its entirety.

What is claimed is:

1. A hybrid processing method of outputting current position data, which indicate a current position of a movable body on which a self-contained positioning device and a GPS device are mounted, on the basis of self-contained positioning data from the self-contained positioning device and GPS measurement data from the GPS device, said method comprising:

a judgment process of judging whether or not an estimated error of the self-contained positioning data is greater than a predetermined threshold value;

a first calculation process of calculating the current position by combining the GPS measurement data with the self-contained positioning data if the estimated error is judged not greater than the predetermined threshold value;

a second calculation process of calculating the current position from the GPS measurement data without combining the GPS measurement data with the self-contained positioning data if the estimated error is judged greater than the predetermined threshold value; and an output process of outputting the current position calculated by said first or second calculation process as the current position data which indicate the current position of the movable body, wherein said judgement process performs the judgement before elapsing a predetermined period from a time of switching on a power of the self-contained positioning device, and if the judgement is not performed, the present position is calculated by the first calculation process.

2. A hybrid processing method according to claim 1, wherein estimated error data, which indicate the estimated error, are outputted from the self-contained positioning device and said judgment process performs the judgment on the basis of the estimated error data.

3. A hybrid processing method according to claim 1, further comprising an estimated error calculation process of calculating the estimated error on the basis of the self-contained positioning data.

4. A hybrid processing method according to claim 1,
wherein said first calculation process (i) calculates the n-th measurement position from the GPS measurement data outputted for the n-th time (n is a natural number) by the GPS device, (ii) estimates the n+1-th measurement position as an estimated position depending on the self-contained positioning data with using the n-th measurement position as a standard, (iii) calculates the n+1-th measurement position from the GPS measurement data outputted for the n+1-th time by the GPS device, and (iv) performs an error correction based on the estimated position with respect to the n+1-th measurement position, to thereby calculate the n+1-th corrected measurement position as the current position, and said second calculation process (v) calculates the n-th measurement position from the GPS measurement data outputted for the n-th time by the GPS device, (vi) estimates the n+1-th measurement position as an estimated position depending on the GPS measurement data with using the n-th measurement position as a standard, (vii) calculates the n+1-th measurement position from the GPS measurement data outputted for the n+1-th time by the GPS device, and (viii) performs an error correction based on the estimated position with respect to the n+1-th measurement position, to thereby calculate the n+1-th corrected measurement position as the current position.

5. A hybrid processing method according to claim 1, wherein said judgment process does not perform the judgment after elapsing the predetermined period.

6. A hybrid processing apparatus for outputting current position data, which indicate a current position of a movable body on which a self-contained positioning device and a GPS device are mounted, on the basis of self-contained positioning data from the self-contained positioning device and GPS measurement data from the GPS device, said apparatus comprising:

a judgment device for judging whether or not an estimated error of the self-contained positioning data is greater than a predetermined threshold value;

a first calculation device for calculating the current position by combining the GPS measurement data with the self-contained positioning data if the estimated error is judged not greater than the predetermined threshold value;

a second calculation device for calculating the current position from the GPS measurement data without combining the GPS measurement data with the self-contained positioning data if the estimated error is judged greater than the predetermined threshold value; and an output device for outputting the current position calculated by said first or said second calculation device as the current position data which indicate the current position of the movable body, wherein said judgement device performs the judgement before elapsing a predetermined period from a time of switching on a power of the self-contained positioning device, and if the judgement is not performed, the present position is calculated by the first calculation device.

7. A hybrid processing apparatus according to claim 6, wherein estimated error data, which indicate the estimated error, are outputted from the self-contained positioning device and said judgment device performs the judgment on the basis of the estimated error data.

8. A hybrid processing apparatus according to claim 6, further comprising an estimated error calculation device for calculating the estimated error on the basis of the self-contained positioning data.

9. A hybrid processing apparatus according to claim 6,
wherein said first calculation device (i) calculates the n-th measurement position from the GPS measurement data outputted for the n-th time (n is a natural number) by the GPS device, (ii) estimates the n+1-th measurement position as an estimated position depending on the self-contained positioning data with using the n-th measurement position as a standard, (iii) calculates the n+1-th measurement position from the GPS measurement data outputted for the n+1-th time by the GPS device, and (iv) performs an error correction based on the estimated position with respect to the n+1-th measurement position, to thereby calculate the n+1-th corrected measurement position as the current position, and said second calculation device (v) calculates the n-th measurement position from the GPS measurement data outputted for the n-th time by the GPS device, (vii) estimates the n+1-th measurement position as an estimated position depending on the GPS measurement data with using the n-th measurement position as a standard, (vii) calculates the n+1-th measurement position from the GPS measurement data outputted for the n+1-th time by the GPS device, and (viii) performs an error correction based on the estimated position with respect to the n+1-th measurement position, to thereby calculate the n+1-th corrected measurement position as the current position.

10. A hybrid processing apparatus according to claim 6, wherein said judgment device does not perform the judgment after elapsing the predetermined period.

11. An on-vehicle navigation system comprising:

(i) a hybrid processing apparatus for outputting current position data, which indicate a current position of a movable body on which a self-contained positioning device and a GPS device are mounted, on the basis of self-contained positioning data from the self-contained positioning device and GPS measurement data from the GPS device, said apparatus comprising: a judgment device for judging whether or not an estimated error of the self-contained positioning data is greater than a predetermined threshold value; a first calculation device for calculating the current position by combining the GPS measurement data with the self-contained positioning data if the estimated error is judged not greater than the predetermined threshold value; a second calculation device for calculating the current position from the GPS measurement data without combining the GPS measurement data with the self-contained positioning data if the estimated error is judged greater than the predetermined threshold value; and an output device for outputting the current position calculated in said first or second calculation device as the current position data which indicate the current position of the movable body, wherein said judgement device performs the judgement before elapsing a predetermined period from a time of switching on a power of the self-contained positioning device, and if the judgement is not performed, the present position is calculated by the first calculation device, (ii) the self-contained positioning device and the GPS device, and (iii) a display device for displaying the current position data outputted from said output device on map data in a predetermined format.

12. A program storage device readable by a computer, tangibly embodying a program of instructions executable by the computer to perform method processes of outputting current position data which indicate a current position of a movable body, on which a self-contained positioning device and a GPS device are mounted, on the basis of self-contained positioning data from the self-contained positioning device and GPS measurement data from the GPS device, said method processes comprising:

a judgment process of judging whether or not an estimated error of the self-contained positioning data is greater than a predetermined threshold value;

a first calculation process of calculating the current position by combining the GPS measurement data with the self-contained positioning data if the estimated error is judged not greater than the predetermined threshold value;

a second calculation process of calculating the current position from the GPS measurement data without combining the GPS measurement data with the self-contained positioning data if the estimated error is judged greater than the predetermined threshold value; and an output process of outputting the current position calculated by said first or second calculation process as the current position data which indicate the current position of the movable body, wherein said judgement process performs the judgement before elapsing a predetermined period from a time of switching on a power of the self-contained positioning device, and if the judgement is not performed, the present position is calculated by the first calculation process.

13. A computer data signal embodied in a carrier wave and representing a series of instructions which cause a computer to perform method processes of outputting current position data which indicate a current position of a movable body, on which a self-contained positioning device and a GPS device are mounted, on the basis of self-contained positioning data from the self-contained positioning device and GPS measurement data from the GPS device, said method processes comprising:

a judgment process of judging whether or not an estimated error of the self-contained positioning data is greater than a predetermined threshold value;

a first calculation process of calculating the current position by combining the GPS measurement data with the self-contained positioning data if the estimated error is judged not greater than the predetermined threshold value;

a second calculation process of calculating the current position from the GPS measurement data without combining the GPS measurement data with the self-contained positioning data if the estimated error is judged greater than the predetermined threshold value; and an output process of outputting the current position calculated by said first or second calculation process as the current position data which indicate the current position of the movable body, wherein said judgement process performs the judgement before elapsing a predetermined period from a time of switching on a power of the self-contained positioning device, and if the judgement is not performed, the present position is calculated by the first calculation process.

* * * * *